Dec. 5, 1950     H. WEBER     2,532,975
REMOTE CONTROL DEVICE FOR BRAKES
AND OTHER REMOTE CONTROL PARTS
Filed March 27, 1950     2 Sheets-Sheet 1
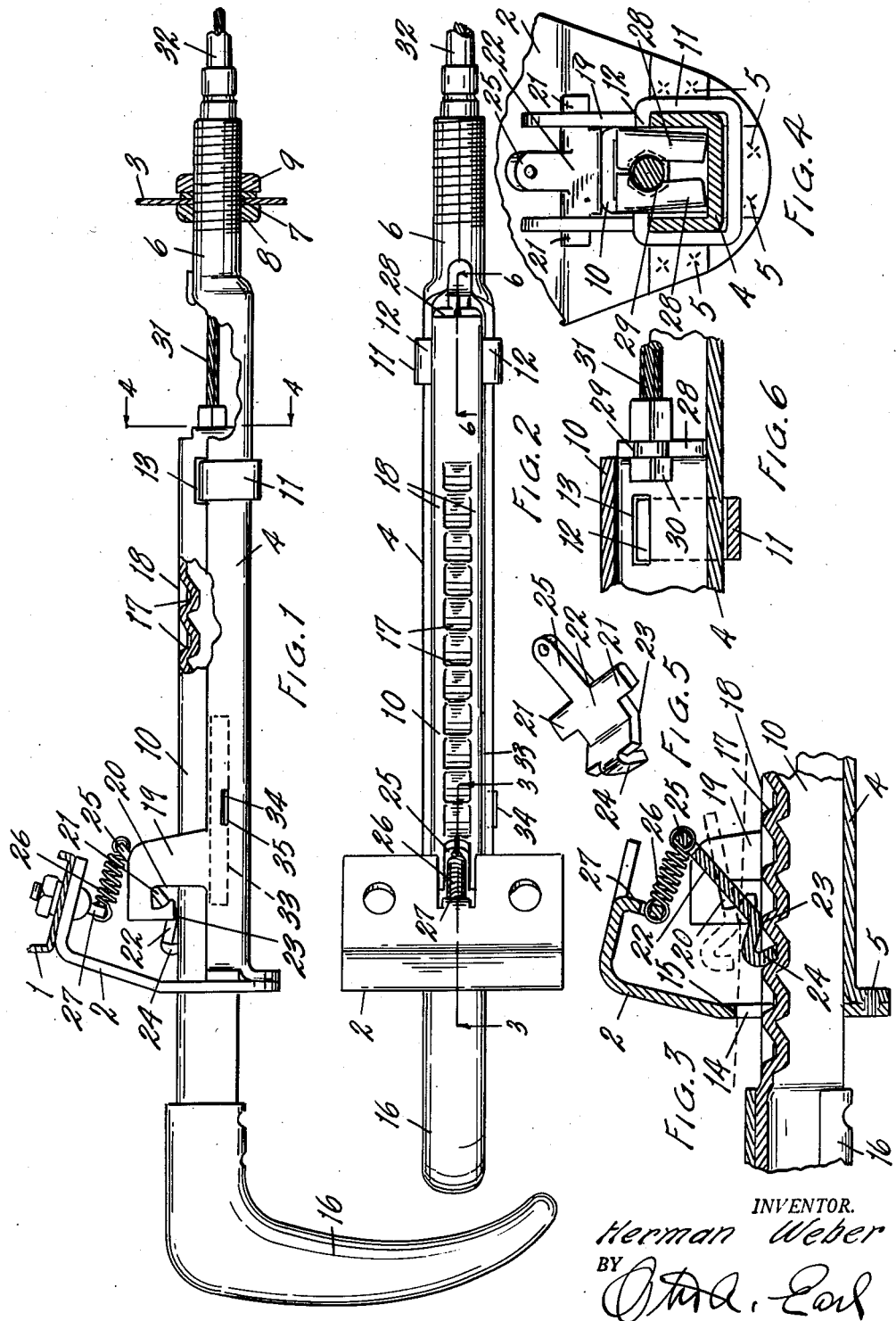
INVENTOR.
Herman Weber
BY
Attorney.

Dec. 5, 1950 H. WEBER 2,532,975
REMOTE CONTROL DEVICE FOR BRAKES
AND OTHER REMOTE CONTROL PARTS
Filed March 27, 1950 2 Sheets-Sheet 2

INVENTOR.
Herman Weber
BY
Attorney.

Patented Dec. 5, 1950

2,532,975

UNITED STATES PATENT OFFICE 2,532,975

REMOTE-CONTROL DEVICE FOR BRAKES AND OTHER REMOTE CONTROL PARTS

Herman Weber, Kalamazoo, Mich., assignor to Shakespeare Products Company, Kalamazoo, Mich.

Application March 27, 1950, Serial No. 152,189

9 Claims. (Cl. 74—503)

This invention relates to improvements in remote control devices for brakes and other remote control parts.

The main objects of this invention are:

First, to provide a control device of the pawl and ratchet type which is well adapted for use in controlling brakes and one in which the pawl is automatically released by a natural movement or pull on the control member and at the same time automatically engages when the control member is released by the operator.

Second, to provide a control device which does not require manual manipulation to release the pawl other than by a lifting pull manipulation on the single grip.

Third, to provide a structure embodying these advantages which has relatively few parts and one in which the parts may be readily assembled.

Objects relating to details and economies of the invention will appear from the description to follow. The invention is pointed out in the claims.

A preferred embodiment of the invention is illustrated in the accompanying drawings, in which:

Fig. 1 is a fragmentary side elevational view of a control device embodying my invention, parts being shown in section and parts being broken away.

Fig. 2 is a plan view thereof, the transmission member and its sheath being broken away.

Fig. 3 is a fragmentary view mainly in longitudinal section on a line corresponding to line 3—3 of Fig. 2, the parts being indicated in pawl releasing position by dotted lines.

Fig. 4 is an enlarged fragmentary view in transverse section on a line corresponding to line 4—4 of Fig. 1.

Fig. 5 is a perspective view of the pawl.

Fig. 6 is an enlarged fragmentary view partially in longitudinal section on a line corresponding to line 6—6 of Fig. 2.

Figure 7:
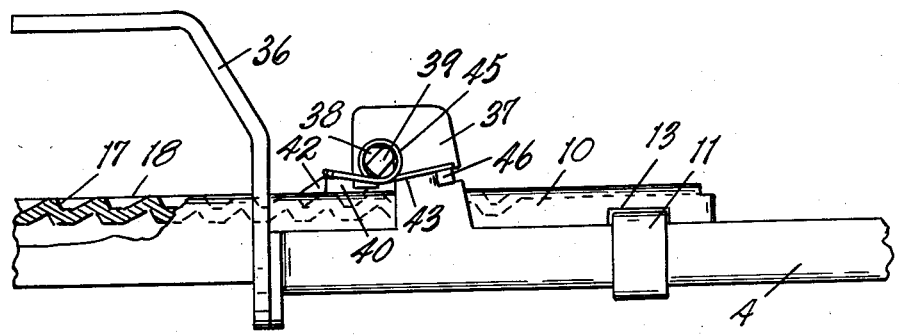
Fig. 7 is a fragmentary view partially in longitudinal section of a modified form or embodiment of my invention.
Figure 8:
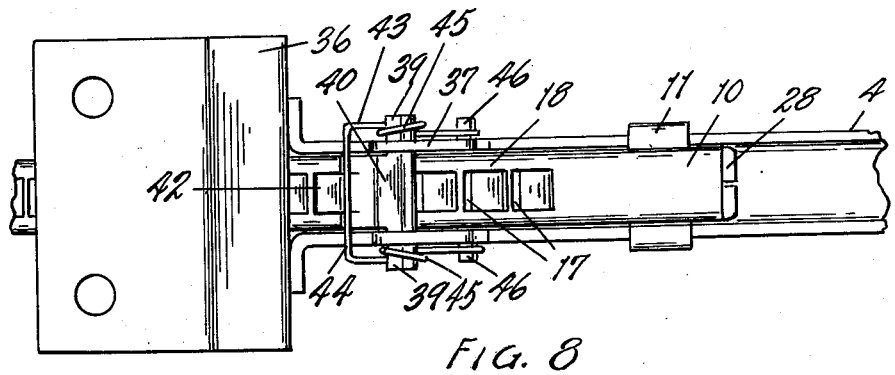
Fig. 8 is a fragmentary plan view of the embodiment of Fig. 7.
Figure 9:
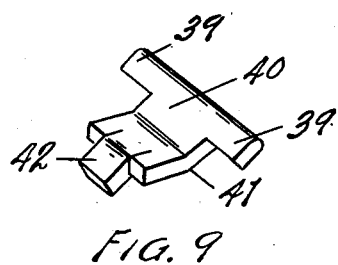
Fig. 9 is a perspective view of the pawl of the embodiment of Figs. 7 and 8.

In the embodiment illustrated in the accompanying drawing 1 represents a part of a motor vehicle or other support on which the bracket 2 is mounted and 3 represents a wall through which the control projects. The support member 4 is of upwardly facing channel section, its front end being secured to the lower end of the bracket 2 as by spot welds 5. The support member has a tubular extension 6 at its rear end disposed through an opening 7 in the wall 3 and threaded to receive the clamping nuts 8 and 9. The adjusting member 10 is of downwardly facing U section and is slidably and tiltably disposed within the support member 4. The U-shaped clip or retaining member 11 embraces the support member and has inturned lugs 12 projecting over the upper edge of the support member and into openings 13 in the sides of the adjusting member.

There is sufficient clearance between the retaining clip 11 and the support (see Figs. 4 and 6) to permit tilting of the adjusting member on its rear end. The opening 14 in the bracket 2 through which the adjusting member is disposed is of such vertical dimensions that its upper edge 15 serves as a stop limiting the tilting movement. The adjusting member is provided with a grip 16 on its forward end. The web of the adjusting member is conformed to provide a longitudinal series of inset rearwardly facing ratchet teeth 17 and parallel longitudinal ways 18 at the sides thereof.

The support member is provided with upwardly projecting ears 19 adjacent the front end thereof defining downwardly facing pawl pivot receiving recesses or openings 20 with which the pivots 21 of the pawl 22 are engaged. This engagement is effected before the adjusting member is inserted into the support member from the front end thereof. The pawl 22 is desirably formed as a stamping and is angled in advance of the pivots 21 to provide a fulcrum 23 which slidably engages the ways 18. The tooth 24 of the pawl is directed downwardly to coact with the ratchet teeth of the adjusting member. The pawl has a rearwardly extending tail portion 25 to which the biasing spring 26 is connected, the other end of the spring being connected to the downturned lug 27 on the bracket. With this arrangement an upward lift or tilting of the adjusting member disengages the pawl as is shown by dotted lines in Fig. 3. As soon as the adjusting member is permitted to return to its normal position as shown by full lines in Fig. 3 the pawl assumes its ratchet engaging position. The fulcruming way surfaces 18 are desirably in the plane of the tips of the teeth.

In assembling, the adjusting member is introduced through the opening 14 in the bracket and longitudinally into the support member and the retaining clip 11 is then applied, this clip being initially open to permit its being slipped over the support member and closed up to retaining position. The adjusting member is provided with inturned flange-like lugs 28 on its rear end recessed at 29 to receive the head 30 on the transmission element 31. The transmission element is arranged through the tubular extension 6 and is desirably provided with a sheath 32.

To prevent rattling a spring 33 is interposed between one side of the adjusting member and the side of the support member, the spring being provided with a tongue 34 disposed in an opening 35 in the support member for retaining it in assembled relation. This spring is positioned before the adjusting member is inserted within the support member. With the parts thus arranged the pawl may be released by lifting upwardly on the grip of the adjusting member. That movement is a natural movement when the parts are mounted on a motor vehicle, for example.

In the embodiment of my invention shown in Fig. 7, the mounting bracket 36 corresponding to the bracket 2 extends forwardly instead of rearwardly as shown in the embodiment of Figs. 1 to 6. The upwardly projecting ears 37 corresponding to the ears 19 are somewhat modified in shape as compared to the ears 19, and are, however, provided with pivot openings 38 for the pivots 39 of the pawl 40. The pawl 40 has a fulcrum 41 coacting with the ways 18 and has a downwardly projecting tooth 42 coacting with the ratchet teeth 17. The pawl biasing spring 43 is of general U-shape, its bite 44 engaging the pawl, the arms of the spring having coils 45 therein engaging the projecting ends of the pawl pivots, the ends of the arms of the springs engaging the supporting lugs 46 provided therefor on the ears 37. The structure functions and operates in the same way as in the embodiment of Figs. 1 to 6 inclusive.

In setting a brake or actuating another part adjusting member and the pawl ratchets over it is only necessary to pull forwardly on the the teeth to secure the adjusting member in its adjusted position. The pawl is released by an upward tilting lift on the adjusting member and it is then free to slide or be pushed rearwardly.

The parts of the embodiment of my invention illustrated may be very simply and economically produced and are easily assembled and are strong and durable.

I have not attempted to illustrate or describe other embodiments or adaptations which I contemplate as it is believed that this disclosure will enable those skilled in the art to embody or adapt my invention as may be desired.

Having thus described my invention, what I claim as new and desire to secure by Letters Patent is:

1. In a control device, the combination of an elongated support member of upwardly facing channel section having a bracket at its front end and a tubular extension at its rear end, an adjusting member of downwardly facing channel section slidable and tiltable within said support member and disposed through said bracket member and having inturned lugs at its rear end and a grip at its front end, the web of said adjusting member being conformed to provide a longitudinal series of inset rearwardly facing ratchet teeth with slideways at each side of the teeth and in substantially the plane of the tips of the teeth, upwardly projecting pivot ears on said support member adjacent its front end and having pivot openings therein opening downwardly facilitating the engagement of pawl pivots therewith, a pawl provided with pivots disposed in said pivot openings of said ears, said pawl being conformed to provide a fulcrum portion in advance of its pivots which slidably and tiltably engages said ways on said adjusting member, said pawl having a downturned tooth in front of its fulcrum portion coacting with said ratchet teeth, a biasing spring for said pawl, and a transmission member disposed through said tubular portion of said support and engaged between said lugs at the rear end of said adjusting member.

2. In a control device, the combination of an elongated support member of upwardly facing channel section, an adjusting member of downwardly facing channel section slidable and tiltable within said support member and disposed through said bracket, the web of said adjusting member being conformed to provide a longitudinal series of inset rearwardly facing ratchet teeth with slideways at each side of the teeth and in substantially the plane of the tips of the teeth, upwardly projecting pivot ears on said support member adjacent its front end and having pivot openings therein opening downwardly facilitating the engagement of pawl pivots therewith, a pawl provided with pivots disposed in said pivot openings of said ears, said pawl being conformed to provide a fulcrum portion in advance of its pivots which slidably and tiltably engages said ways on said adjusting member, said pawl having a downturned tooth in front of its fulcrum portion coacting with said ratchet teeth, and a biasing spring for said pawl.

3. In a control device, the combination of an elongated support member of upwardly facing channel section, an adjusting member of downwardly facing channel section slidable and tiltable within said support member and disposed through said bracket, a U-shaped clip member slidably embracing said support and having inturned lugs disposed above the upper edges of the support and engaging said adjusting member, there being clearance permitting the tilting of the adjusting member on its inner end, said bracket being provided with stop means limiting the upward tilting movement of the adjusting member, the web of said adjusting member being conformed to provide a longitudinal series of inset rearwardly facing ratchet teeth with slideways at each side of the teeth and in substantially the plane of the tips of the teeth, upwardly projecting pivot ears on said support member adjacent its front end and having pivot openings therein opening downwardly facilitating the engagement of pawl pivots therewith, a pawl provided with pivots disposed in said pivot openings of said ears, said pawl being conformed to provide a fulcrum portion in advance of its pivots which slidably and tiltably engages said ways on said adjusting member, said pawl having a downturned tooth in front of its fulcrum portion coacting with said ratchet teeth, and a biasing spring for said pawl.

4. In a control device, the combination of an elongated support member of upwardly facing channel section at its rear end, an adjusting member of downwardly facing channel section slidable and tiltable within said support member, a clip member slidably embracing said support and engaging said adjusting member, there being clearance permitting the tilting of the adjusting member on said support member, stop means limiting the upward tilting movement of the adjusting member, the web of said adjusting member being conformed to provide a longitudinal series of ratchet teeth with a slideway parallel to the teeth, and a spring biased pawl mounted on said support member to coact with said ratchet teeth, said pawl having slidable fulcruming engagement with said adjusting member whereby when the adjusting member is tilted the pawl is actuated to and held in disengaged position relative to the ratchet teeth of the adjusting member.

5. In a control device, the combination of an elongated support member of upwardly facing channel section at its rear end, an adjusting member of downwardly facing channel section slidable and tiltable within said support member, the web of said adjusting member being conformed to provide a longitudinal series of ratchet teeth with a slideway parallel to the teeth, and a spring biased pawl mounted on said support member to coact with said ratchet teeth, said pawl having slidable fulcruming engagement with said adjusting member whereby when the adjusting member is tilted the pawl is actuated to and held is disengaged position relative to the ratchet teeth of the adjusting member.

6. In a control device, the combination of an elongated support member of upwardly facing channel section, an adjusting member slidable and tiltable on said support member, a clip member slidably embracing said support member and engaging said adjusting member near its rear end while permitting tilting of the adjusted member on its rear end, stop means for limiting the upward tilting movement of said adjusting member, and a spring biased pawl mounted on said support member and having sliding fulcruming engagement with said adjusting member, said adjusting member being provided with a rearwardly facing series of ratchet teeth with which said pawl coacts when the adjusting member is in its nontilted position.

7. In a control device, the combination of an elongated support member of upwardly facing channel section, an adjusting member slidable and tiltable on said support member, and a spring biased pawl mounted on said support member and having sliding fulcruming engagement with said adjusting member, said adjusting member being provided with a rearwardly facing series of ratchet teeth with which said pawl coacts when the adjusting member is in its nontilted position.

8. In a control device, the combination of a support member, an adjusting member slidably and tiltably mounted on said support and having a longitudinal series of ratchet teeth, and a spring biased pawl mounted on said support member to coact with said ratchet teeth, said pawl having slidable fulcruming engagement with said adjusting member whereby when the adjusting member is tilted the pawl is actuated to and held in disengaged position relative to the ratchet teeth of the adjusting member.

9. In a control device, the combination of a support member, an adjusting member slidable and tiltable relative to said support member and having a longitudinal series of ratchet teeth, and a spring biased pawl mounted on said support member to coact with said ratchet teeth, said pawl being slidably fulcrumed on said adjusting member so that when the adjusting member is tilted the pawl is actuated to disengaged position thereby permitting free adjustment of the adjusting member.

HERMAN WEBER.

REFERENCES CITED

The following references are of record in the file of this patent:

UNITED STATES PATENTS

| Number | Name | Date |
|---|---|---|
| 2,303,586 | Snell | Dec. 1, 1942 |